No. 696,902. Patented Apr. 1, 1902.
J. GRAY, Sr.
BORING TOOL.
(Application filed Sept. 6, 1901.)
(No Model.) 2 Sheets—Sheet 2.
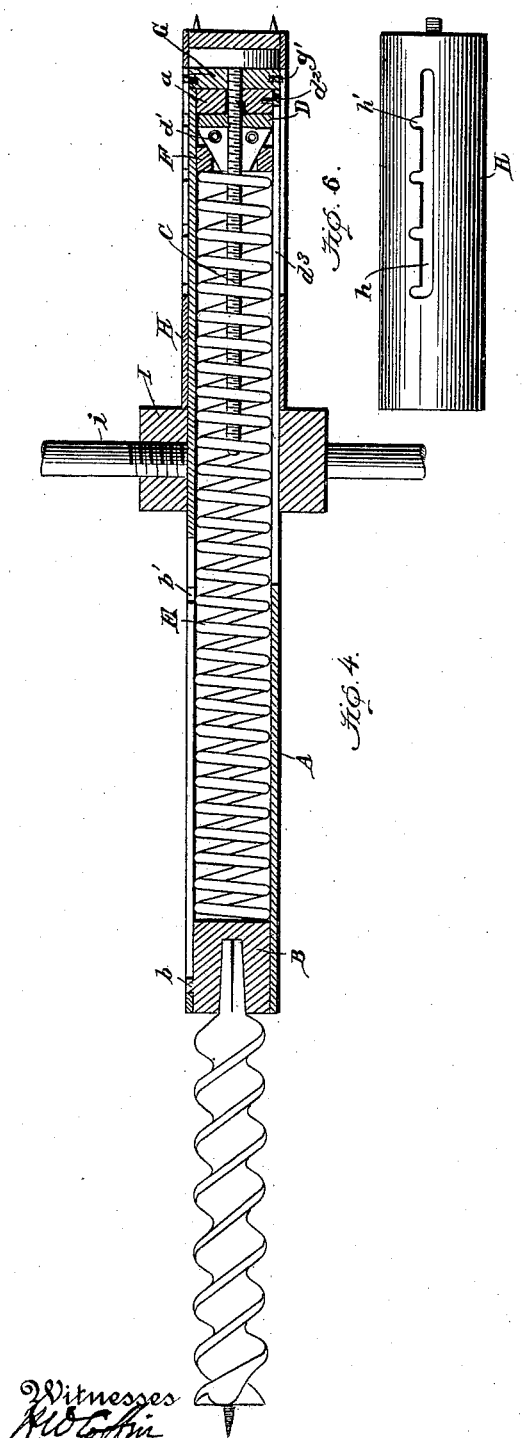
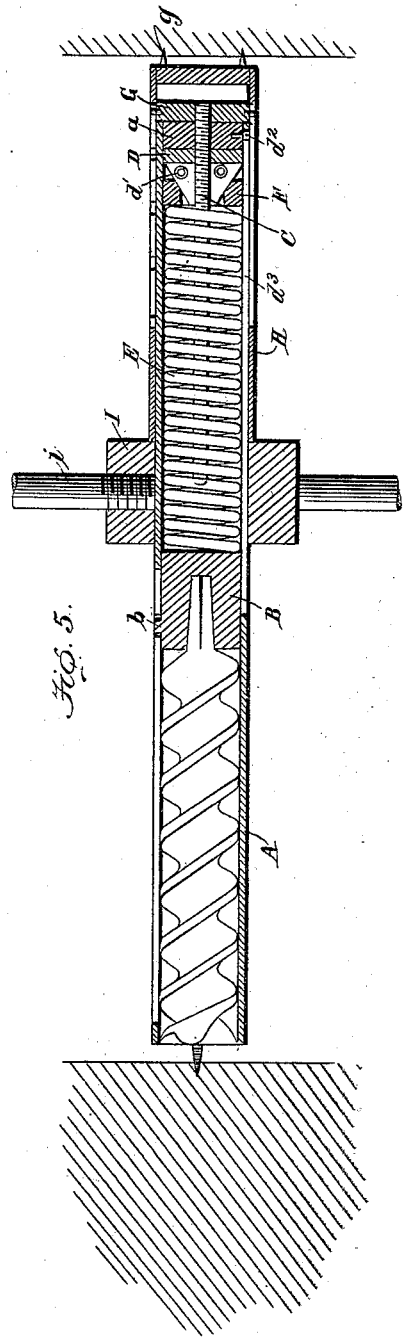
Witnesses
H. W. Coffin
A. H. McArthur.
Inventor
John Gray, Sr.
By Chas. E. Pindar
his Attorney

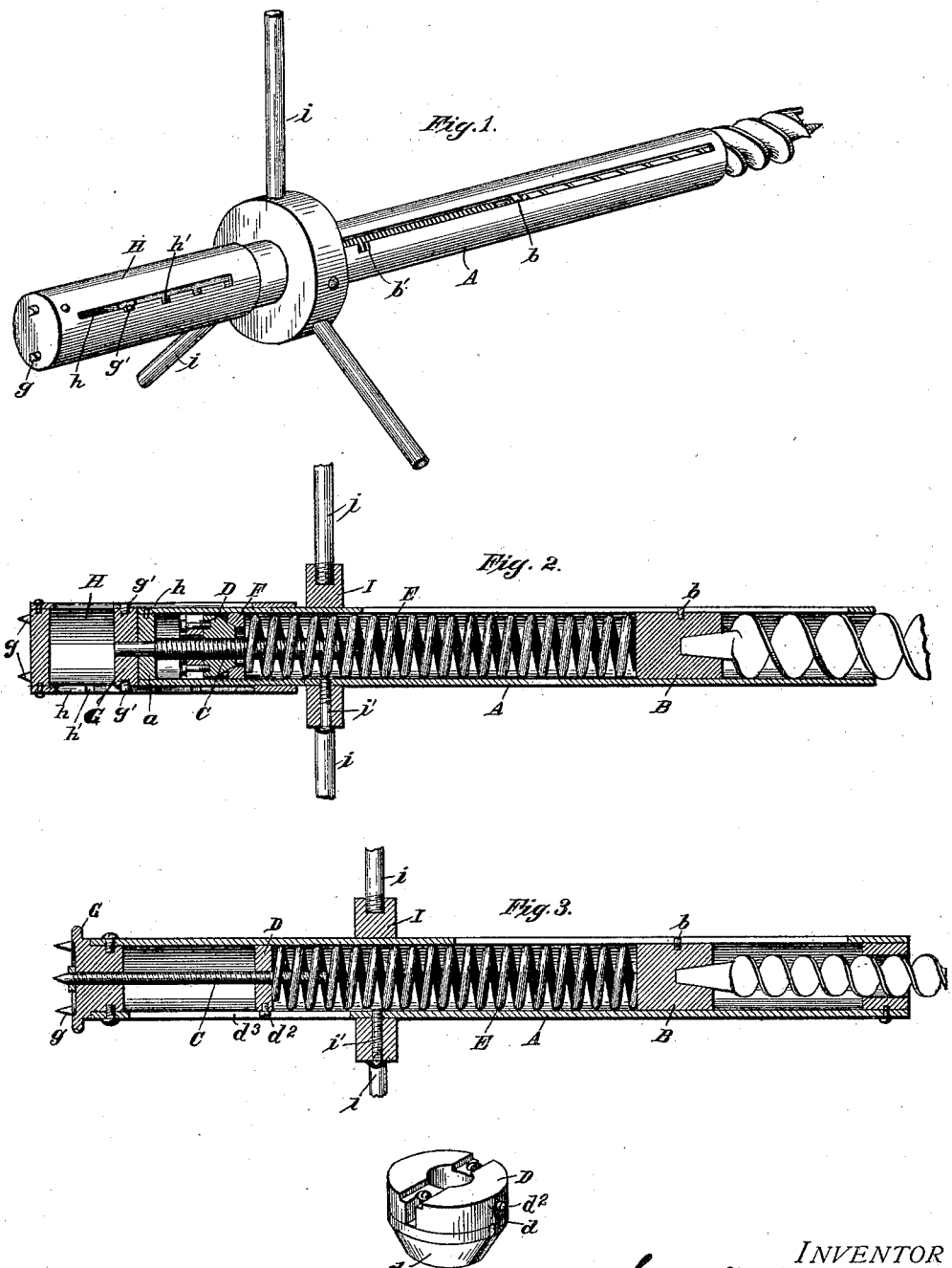

UNITED STATES PATENT OFFICE.

JOHN GRAY, SR., OF WASHINGTON, DISTRICT OF COLUMBIA, ASSIGNOR OF ONE-HALF TO CHARLES S. CAMPBELL, OF WASHINGTON, DISTRICT OF COLUMBIA.

BORING-TOOL.

SPECIFICATION forming part of Letters Patent No. 696,902, dated April 1, 1902.

Application filed September 6, 1901. Serial No. 74,499. (No model.)

*To all whom it may concern:*

Be it known that I, JOHN GRAY, Sr., a citizen of the United States, residing at Washington, in the District of Columbia, have invented certain new and useful Improvements in Boring-Tools, of which the following is a specification.

This invention relates to tools or implements for boring.

In many instances it is found that owing to limited or confined space within which to work, that the tools ordinarily employed in carpentry and like work are unfitted for ready manipulation or operation—as, for instance, in the boring of lateral holes in floor or ceiling joists and similar confined spaces.

The object of the present invention is to produce a tool for the special purpose of operation in such confined spaces, such tool comprising a barrel carrying a longitudinally-movable tool chuck or head, which is automatically advanced as the tool progresses in its work.

The invention consists in the matters to be hereinafter described, and particularly set forth in the claims.

In the accompanying drawings, in which similar letters of reference are used to denote corresponding parts in each of the several views, Figure 1 is a perspective view of a tool embodying my invention. Fig. 2 is a longitudinal axial section thereof. Fig. 3 is a similar view showing a modification. Figs. 4 and 5 are longitudinal sections illustrating the tool at the opposite limits of its movement. Figs. 6 and 7 are details of essential parts.

The tool comprises a tubular body A, open at one end and having mounted therein a chuck B, designed to move longitudinally of the body, but not to rotate therein. This chuck B may be of any usual or preferred form, its purpose being to carry a bit or tool, that shown being the ordinary well-known auger-bit. The opposite end of the body is closed with a solid head $a$, within which is seated a threaded shaft C. A longitudinally-movable automatically-actuated nut D is in threaded engagement with this shaft C, and between this nut and the chuck B is confined a coiled spring E, the stress of which is exerted to thrust said chuck in the direction of the open end of the tool-body A.

Referring now specifically to Figs. 2, 4, 5, and 7, the nut D comprises two halves $d\ d$, between which are inserted springs $d'\ d'$, in this instance shown as spiral springs, which tend to thrust the parts of the nut asunder, and hence out of threaded engagement with the screw-shaft C. The forward end of the nut is tapered or cone-shaped, and in engagement with such cone-shaped end is a correspondingly-apertured follower or abutment F, which forms the surface or abutment, taking the thrust of the inner end of the spring E, and hence when tension is upon said spring forcing and holding the two parts of the nut together and in threaded engagement with the screw-shaft C. From this construction it will be observed that when there is tension upon the spring E, due to its confinement or compression between the chuck and the nut D, that the split nut will be constantly in threaded engagement with the screw-shaft; but when the tool has advanced so far in its work that the chuck has advanced practically to its limit and the tension of the spring E is so reduced as not to overcome the tension of the springs $d'\ d'$ the nut will be no longer in operative engagement with the screw-shaft and may therefore be dropped back in the direction of the head $a$. The lug or projection $d^2$ works in a slot $d^3$ in the tubular body A, thus causing the nut D to rotate with said tubular body.

In the instance shown the tubular body A is cylindrical in cross-section, and the chuck B is retained from rotation therein by means of a stud or lug $b$, projecting therefrom into a longitudinal slot in the tool-body. It will be understood, however, that the tubular body A may be of angular cross-section, thereby avoiding the necessity of providing the slot and lug. At the inner end of the longitudinal slot of the tool-body is shown a recess $b'$ to receive the lug $b$ of the chuck, the purpose being to lock the chuck and bit in its retracted position.

The rear end of the tool-body carries a swiveled head G, provided with spurs or tangs g to afford a hold upon a joist or other rest against which it may be seated, as shown, for instance, in Fig. 5, and prevent rotation of said head when the tool-body is rotated to advance the bit in the act of boring. In the preferred construction these tangs project from a sleeve H, embracing the closed or rear end of the tool-body proper and having adjustable connection therewith. In the instance shown the head G is provided with lugs $g'$, in operative engagement with longitudinal slots $h$ of the sleeve H, said slots being provided at suitable intervals with recesses $h'$, affording locking engagement with the lugs $g'$, and thus providing for the adjustment in length of the tool as a whole and at the same time preventing the rotation of shaft C when the tool is in use.

The tool-body may be fitted with any appropriate means for effecting its rotation, the means shown being a collar I, rigidly secured to the tool-body and provided with detachable rods or handholes $i$, as shown. This has been found a convenient construction, for the reason that the rods may be removed from the collar, thus reducing the lateral bulk of the tool when not in use. In the drawings the collar I is shown secured to the tool-body by means of screws $i'$.

In Fig. 3 is illustrated a form of the device wherein the nut or abutment D is solid and must be retracted by a reversal of the movement of the tool-body A with respect to the screw-shaft C. This figure also shows the tool as non-adjustable in length and as being fitted at its open end with means to provide for the use of a bit smaller than the diameter of the tool-body. This means consists of a ferrule of proper diameter slipped within the open end of the tool-body and secured therein in any appropriate manner. It will be understood that in the event of making the tool-body of angular cross-section that such a guiding-ferrule would be necessary even with the largest bit capable of use in the tool.

Having thus described the construction of my invention, the operation is as follows: A suitable bit having been selected and fitted to the chuck, the latter being in place in the tool-body, the point of the bit is now set against any suitable fixed support and pressure applied to the other end of the tube to force the bit back into the tube, the lug or projection $b$ traveling in the slot in the tube-body until it reaches the recess $b'$, into which it is inserted by a slight axial movement imparted to the tube. This operation of "setting" the tool compresses the spring E, and in this condition the spring is held by reason of the lug being locked in the retaining-recess $b'$. The tool is now inserted between the joists, as shown in Fig. 5, and the lug is released from the recess $b'$, which permits the tension of the spring to be exerted on the bit. The tube is now rotated by means of the radial arms I I I, which through the intermediate mechanism already described rotates the bit and causes it to enter the work in the usual manner. The screw-shaft C remains stationary, while the nut D, rotating with the tube, is fed outwardly and keeps up a constant pressure on the spring E to compensate for the forward movement of the bit. After the hole has been bored the bit is passed through the hole, thus detaching it from the tool proper, which is now removed from the work and the bit, chuck, spring, and nut restored to their normal positions.

Having thus fully described my invention, what I claim as new, and desire to secure by Letters Patent of the United States, is—

1. In a tool of the character described, the combination with the tubular body, of a longitudinally-movable chuck, a longitudinally-movable follower or abutment, a spring confined between the chuck and abutment, means for advancing the follower or abutment as the work progresses, and means for disconnecting the abutment from its advancing means.

2. In a tool of the character described, the combination of the tubular body, the chuck, the swiveled head, the compression-spring, the screw-shaft, the divided cone-shaped nut provided with springs adapted to thrust the two parts of said nut out of engagement with the screw-shaft, and a follower or abutment.

3. In a tool of the character described, the combination of the tubular body, the chuck, the swiveled head provided with spurs or tangs, the compression-spring and the screw-shaft and automatically-actuated divided nut.

4. In a tool of the character described, the combination of the tubular body, the chuck, the swiveled head, the compression-spring, the screw-shaft, the automatically-actuated divided cone-shaped nut and its follower or abutment.

5. In a tool of the character described, the combination with a tubular body, a longitudinally-movable chuck, a longitudinally-movable follower or abutment, a spring confined between the chuck and abutment, means for advancing the follower or abutment as the work progresses, and a longitudinally-adjustable sleeve.

6. In a tool of the character described, the combination with the tubular body, a longitudinally-movable chuck, a longitudinally-movable follower or abutment, a spring confined between the chuck and abutment, means for advancing the follower and abutment as the work progresses and a longitudinally-adjustable sleeve provided with spurs or tangs, substantially as described.

7. In a tool of the character described, the combination of the tubular body, the chuck, the swiveled head, the compression-spring, the screw-shaft, the automatically-actuated divided nut, its follower or abutment, and a collar secured to and surrounding the tubular body and provided with handholds, substantially as described.

8. In a tool of the character described, the combination of the tubular body, the chuck, a longitudinally-adjustable sleeve provided with spurs or tangs, the head operatively secured to said sleeve, the compression-spring, the screw-shaft, and the automatically-actuated divided cone-shaped nut and its follower or abutment.

9. In a tool of the character described, the combination of the tubular body, the longitudinally-movable chuck, a longitudinally-movable follower or abutment, a spring confined between the chuck and abutment, a ferrule secured in the open end of the tubular body, and means for advancing the follower or abutment as the work progresses.

10. In a tool of the character described, the combination of the tubular body, the longitudinally-movable chuck, a longitudinally-movable follower or abutment, a spring confined between the chuck and abutment, a ferrule secured in the open end of the tubular body, means for advancing the follower or abutment as the work progresses, and means for disconnecting the abutment from its advancing means.

In testimony whereof I affix my signature in presence of two witnesses.

JOHN GRAY, Sr.

Witnesses:
CHAS. E. RIORDAN,
T. BLAIR SHOEMAKER.